United States Patent [19]

Nakamura et al.

[11] Patent Number: 4,587,569
[45] Date of Patent: May 6, 1986

[54] PRINTER FOR PRINTING MULTI-STANDARD TELEVISION SIGNALS

[75] Inventors: Shunichi Nakamura, Osaka; Hiroyuki Dohi, Takatsuki, both of Japan

[73] Assignee: Mitsubishi Denki Kabushiki Kaisha, Tokyo, Japan

[21] Appl. No.: 617,557

[22] Filed: Jun. 5, 1984

[30] Foreign Application Priority Data

Jun. 8, 1983 [JP] Japan ................................. 58-103606

[51] Int. Cl.4 ............................................... H04N 1/40
[52] U.S. Cl. ...................................... 358/296; 358/11; 358/287
[58] Field of Search ............... 358/296, 298, 134, 266, 358/287, 11, 140; 346/154

[56] References Cited

U.S. PATENT DOCUMENTS 4,399,468  8/1983  Mizuno ........................... 358/296 X Primary Examiner—Joseph W. Hartary
Assistant Examiner—Patrick W. Foster
Attorney, Agent, or Firm—Birch, Stewart, Kolasch & Birch

[57] ABSTRACT

A printer for printing multi-standard T.V. signals achieved by an arrangement in which the starting point of time for the horizontal and vertical writing is controlled by varying set values corresponding to the respective multi-standard signals. The set values are varied by a central processing unit which also controls the read-out of T.V. signals from a video memory and the printer.

1 Claim, 8 Drawing Figures

PRINTER FOR PRINTING MULTI-STANDARD TELEVISION SIGNALS

FIELD OF THE INVENTION

The present invention relates to a printer used in association with a television receiver, and more particularly, to a printer for printing out television signals.

BACKGROUND OF THE INVENTION

In general, there are T.V. programs in which the viewers want to record the broadcast information for future reference. For example, in a "How-To-Cook" program the housewives want to record the cooking information on the T.V. screens. However, under the present system of television receivers they have to write it down in their notebooks while watching the T.V. screen. This is very troublesome, and is actually difficult because they must catch up with the constant flow of the images on the screen, which proceed without considering the viewers' convenience. Recently, videotape recorders have developed, and it is true that they have solved this problem to a great extent. However, in reproducing the videotape it is neccesary to search and select that part of the tape in which the information wanted by the viewer is recorded. As generally known, the re-playing of selected parts of the tape is time- and labor-consuming, so that the housewives are often discouraged from reproducing the videotape in spite of the toil paid by them in recording.

In order to solve the inconvenience mentioned above, the inventor has made an invention which provides a printer for automatically hard-copying the pictures on the T.V. screen by writing the gradation density signals of the T.V. pictures in a RAM at real time, and reading them out.

In color television systems there are NTSC systems, PAL system, and SECAM system, all of which differ in the form of transmission of T.V. signals from each other. For example, with respect to the number of scanning lines in one frame, the NTSC system has 525 lines, and the PAL system has 625 lines, showing a large difference in the information capacity. Because of these differences in the form of transmission of T.V. signals a printer for printing out T.V. signals must be adapted to one particular system, and if it is so adapted, it is not applicable to another system. This is due to the fact that the writing address counter for writing T.V. signals in the video memory of the printer is previously set to a value proper to the system (for example, the NTSC system).

OBJECTS AND SUMMARY OF THE INVENTION

The present invention is directed to solve the problems pointed out above, and has for its object to provide an improved printer for printing out multi-standard T.V. signals which is applicable to any color television systems.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a printer for printing T.V. signals, which comprises:
a video memory for storing T.V. signals;
a horizontal counter which starts to count clock pulses when horizontal synchronizing signals of the T.V. signals are input, and generates a horizontal pulse when the counted value becomes equal to a first predetermined value which is variable;
a vertical counter which starts to count horizontal synchronizing signals when vertical synchronizing signals of the T.V. signals are input, and generates a vertical pulse when the counted value becomes equal to a second predetermined value which is variable;
a characters-in-one-line counter which starts to count the clock pulses when the horizontal pulse is input, and generates an operation stop signal when the counted value becomes equal to the number of printing characters in one line for the output of the printer;
a writing address counter which resets its counted value when the vertical pulse is input, delivers address signals to the video memory while counting up the number of clock pulses that occur while the horizontal pulse is input, and stops the counting-up and the generating of address signals when the operation stop signal is input;
a read-out control circuit for reading out the T.V. signals stored in the video memory; and
a printer for printing the read-out T.V. signals.

DETAILED DESCRIPTION OF THE PREFERRED EMBODIMENT

Figure 1:
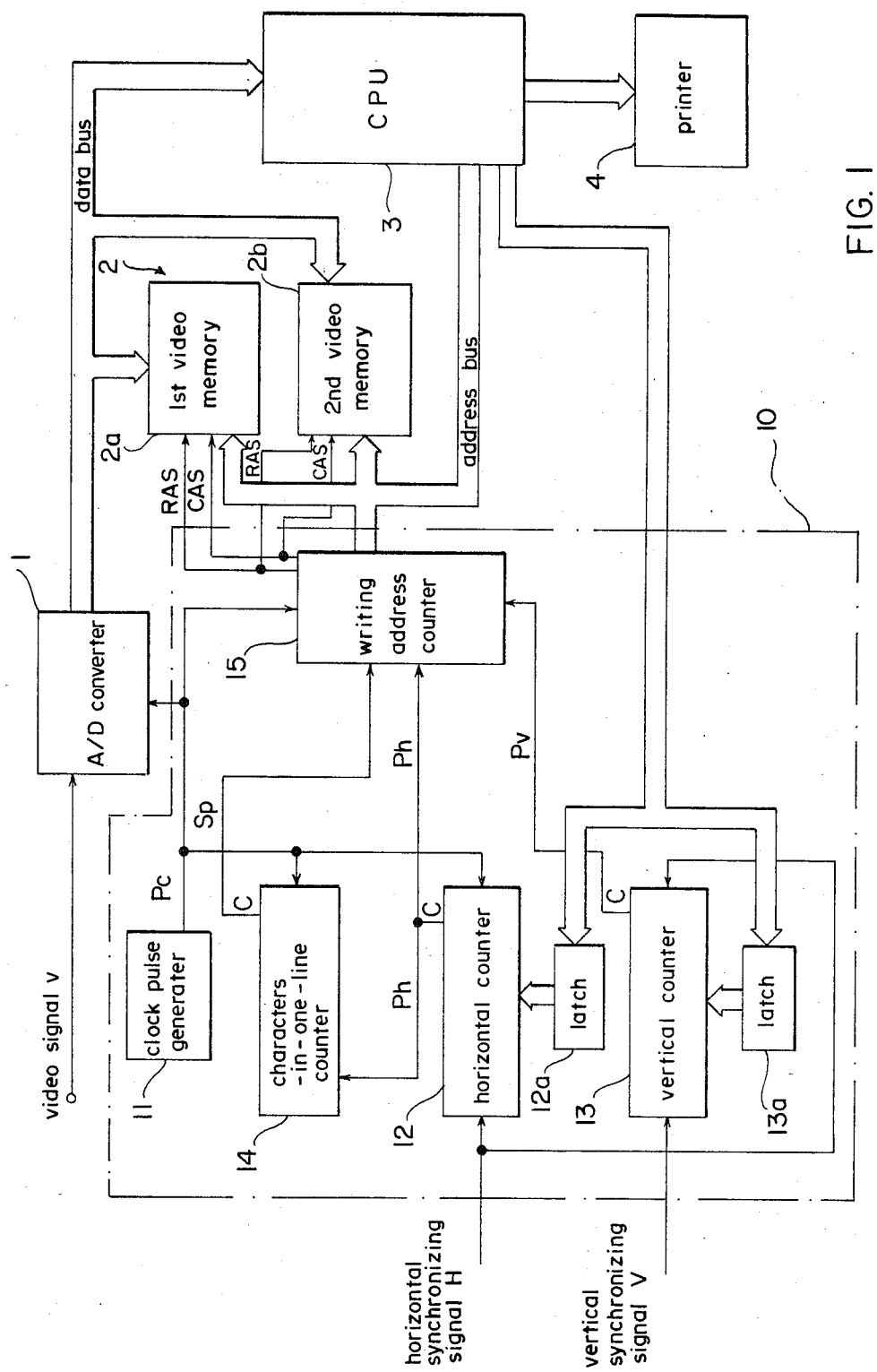
FIG. 1 is a block diagram illustrating a printer embodying the present invention.

Referring to FIG. 1, there is provided an A/D converter 1 which converts television (T.V.) signals v into gradation density signals, which are stored in a first and a second video memory 2a and 2b. When the gradation density signals to be printed out by a printer are written in the memories, a writing address control circuit 10 determines when the horizontal and the vertical writing is initiated. The reference numeral 11 designates a clock pulse generator which generates clock pulses Pc having a higher frequency than that of the horizontal synchronizing signal H of T.V. signals. The reference numeral 12 designates a horizontal counter which starts to count the clock pulses Pc when the horizontal synchronizing signal H of the T.V. signals is input, and generates a horizontal pulse Ph when the predetermined value is reached in counting. A variable value is set to the horizontal counter 12 by a first latch 12a. The reference numeral 13 designates a vertical counter which starts to count the horizontal synchronizing signals H when the vertical synchronizing signal V of the T.V. signals is input, and generates a vertical pulse Pv when the predetermined value is reached in counting. A variable value is set to the vertical counter 13 by a second latch 13a. The reference numeral 14 designates a characters-in-one-line counter which starts to count the clock pulses Pc when the horizontal pulse Ph is input, and generates an operation stop signal Sp when the counted value becomes equal to the number of characters in one line for the output of the printer. The reference numeral 15 designates a writing address counter which resets the counted value when the vertical pulse Pv is input, delivers address signals to the video memory 2 while counting up the clock pulses Pc since the horizontal pulse Ph is input, and stops the counting-up and the generating of address signals when the operation stop signal Sp is input.

The predetermined values set to the horizontal counter 12 and the vertical counter 13 by the latches 12a and 13a are changed by a CPU 3 in accordance with the type of color television system in use. The CPU is also used to effect the read out the gradation density signals stored in the video memory 2. The read-out gradation density signals are printed out by a printer 4.

The operation will be described as follows:

When the copy key (not shown) is switched on, the video signals v are converted into gradation density signals in digital form by the A/D converter 1, which are written in the video memory 2. At this time the writing address control circuit 10 controls the vertical and the horizontal writing of them; more specifically, it determines which of the scanning lines are written after the vertical synchronizing signal V is started and also which of the signals is written after the horizontal synchronizing signal H is started for each scanning line.

Figure 2:
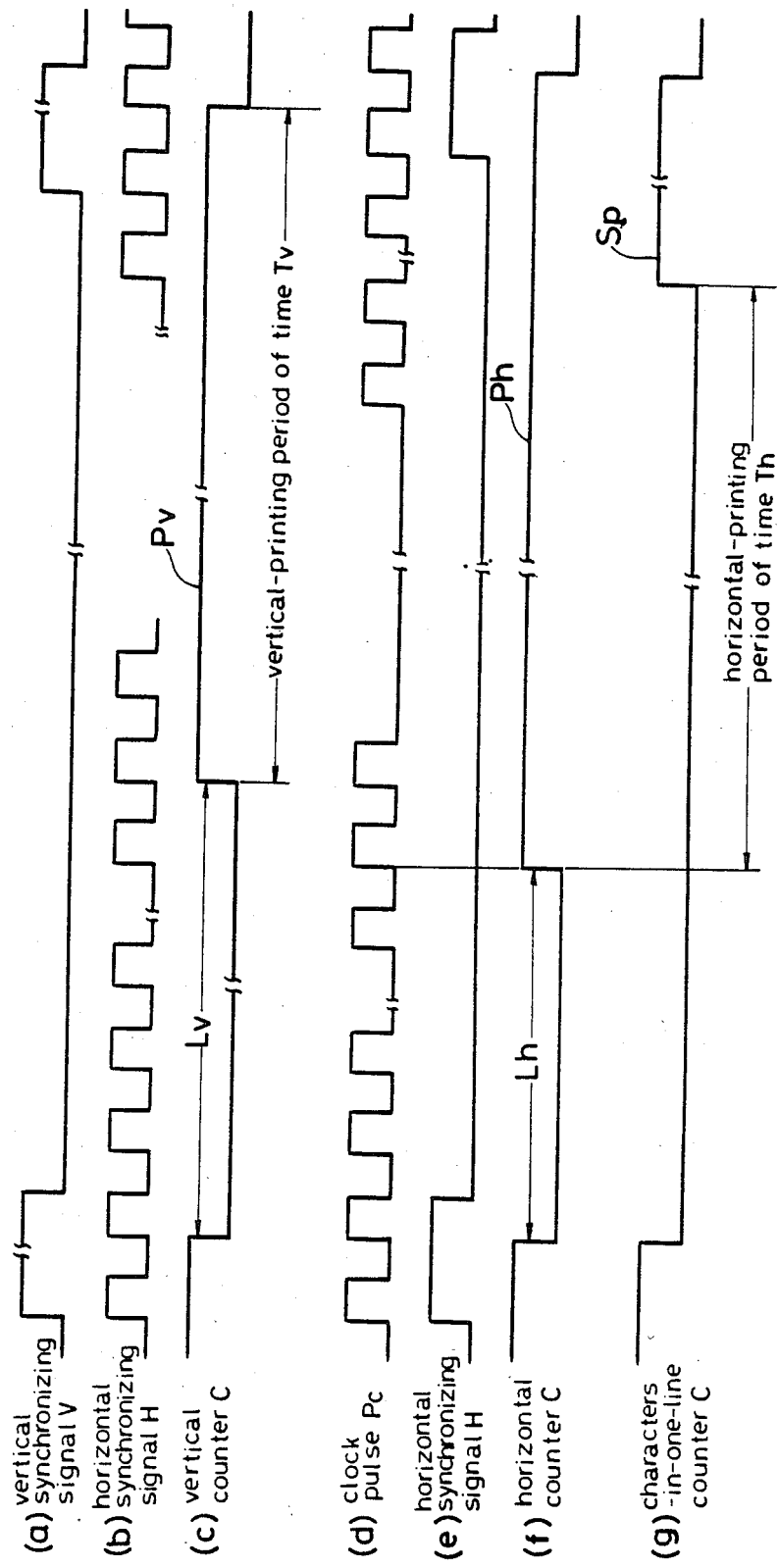
FIGS. 2a-2g are timing diagrams exemplifying the sequence of operation of the system illustrated in FIG. 1.

Firstly as to the control of the vertical writing, as shown in FIG. 2 (a), (b) and (c), when the vertical synchronizing signal V is input to the vertical counter 13, it starts to count the horizontal synchronizing signals H after one period thereof. At the same time, the carry output C of the counter 13 becomes "L" (low), and with this falling the writing address counter 15 comes into a reset state. When the value counted by the vertical counter 13 becomes equal to the value predetermined by the second latch 13a, the counter 13 outputs a vertical pulse Pv at its carry output C. With the rising of the pulse Pv the address counter 15 is released from the reset state. The period of time from the rising of the pulse Pv to the falling thereof which is caused by the next vertical synchronizing signal V corresponds to a period of time for which the portion of the gradation density signals to be printed out for one picture are written in the video memory 2. This period is termed a vertical printing period Tv.

Secondly, so as to the control of the horizontal writing, as shown in FIG. 2 (d), (e), (f) and (g), when the horizontal synchronizing signal H is input to the horizontal counter 12, it starts to count the clock pulses Pc after one period thereof, and at the same time, the carry output of the counter 12 becomes "L". With this falling the characters-in-one-line counter 14 comes into a reset state. When the value counted by the horizontal counter 12 becomes equal to the value predetermined by the latch 12a, the carry output C becomes "H" (high) thereby to output the horizontal pulse Ph. Then the writing address counter 15 and the characters-in-one-line counter 14 start to count the clock pulses Pc at the timing of rising of the pulse Ph, and the writing address counter 15 delivers this counted value as the address signal to the video memory 2. In addition, it delivers row and column address strobe signals (RAS signal and CAS signal) to the video memory 2. At this time the video memory 2 decodes the address signals from the writing address counter 15 to obtain the X-addresses and the Y-addresses by means of the address decoder located therein, and the gradation density signals are written in the X- and Y-addresses at the timings of the RAS signals and the CAS signals. Then, when the counted value of the characters-in-one-line counter 14 becomes equal to "280", which is the number of characters for the print out in one line, the counter 14 generates an operation stop signal Sp, whereby the writing address counter 15 stops counting-up and outputting the address signals. The period of time from the carry output C of the horizontal counter 12 becoming "H" up to the generation of the operation stop signal Sp by the counter 14 corresponds to a period of time for which the portion of the gradation density signals to be printed out among the signals in one horizontal scanning line is written in the video memory 2. This period is termed a horizontal printing period Th.

In this way the gradation density signals to be printed out are written in the video memory for a period of time when the vertical printing period Tv (when the vertical pulse Pv exists) and the horizontal printing period Th overlap. The gradation density signals written in the video memory 2 are read out by the CPU 3, and printed out by the printer 4.

When the types of T.V. systems for transmitting T.V. signals are changed such as between NTSC, PAL and SECAM, it is necessary to change the starting time of vertical and horizontal writing. This is performed by changing the predetermined value of the latches 12a and 13a through the CPU 3 by means of a switch provided on the console. The change in the predetermined value of the latches 12a, 13a causes changes in the timing of rising of the horizontal pulse Ph and the vertical pulse Pv, which are the carry outputs C of the horizontal counter 12 and the vertical counter 13. In this way the starting positions for the vertical and horizontal printing of the video signals are decided as desired, and the writing in the video memory 2 is effected without changing the constant number "280" for characters in one line in the horizontal direction. Thus different color television systems do not affect the effectiveness of printing out the video signals.

As evident from the foregoing description, according to the present invention the gradation density signals necessary for printing out are written in the video memory 2 under the system constituted by the horizontal counter 12, the vertical counter 13, and the characters-in-one-line counter 14, thereby allowing of a minimized memory capacity. This leads to reduced cost. In addition, there is no need for providing a number of printers corresponding to that of color television systems for transmitting T.V. signals, making a single printer sufficient for printing out T.V. signals from various color television systems. This is achieved by the arrangement in which the starting point of time for the horizontal and the vertical writing is controlled by varying set values. Furthermore, the writing control is performed by a single address counter 15.

What is claimed is:

1. A printer for printing T.V. signals, which comprises:

a video memory for storing T.V. signals;

a horizontal counter which starts to count clock pulses when horizontal synchronizing signals of the T.V. signals are input, and generates a horizontal pulse when the counted value becomes equal to a first predetermined value which is variable;

a vertical counter which starts to count horizontal synchronizing signals when a vertical synchronizing signal of the T.V. signals is input, and generates a vertical pulse when the counted value becomes equal to a second predetermined value which is variable;

a characters-in-one-line counter which starts to count the clock pulses when the horizontal pulse is input, and generates an operation stop signal when the counted value becomes equal to the number of printing characters in one line for the output of the printer;

a writing address counter which resets its counted value when the vertical pulse is input, delivers address signals to the video memory while counting up the number of clock pulses that occur while the horizontal pulse is input, and stops the counting-up and the generating of address signals when the operation stop signal is input;

a read-out control circuit for reading out the T.V. signals stored in the video memory; and a printer for printing the read-out T.V. signals.

* * * * *